(12) United States Patent
Salter et al.

(10) Patent No.: US 12,427,855 B1
(45) Date of Patent: Sep. 30, 2025

(54) VEHICLE FLOW CONTROL SYSTEM WITH LIGHTING ASSEMBLY

(71) Applicant: Ford Global Technologies, LLC, Dearborn, MI (US)

(72) Inventors: Stuart C. Salter, White Lake, MI (US); David Pericak, Clinton Township, MI (US); Jeffrey Robert Seaman, Petersburg, MI (US); Samir Datta, Rochester Hills, MI (US); Brendan Diamond, Naples, FL (US); Ryan O'Gorman, Beverly Hills, MI (US); Jenna Rogers, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/609,580

(22) Filed: Mar. 19, 2024

(51) Int. Cl.
| | |
|---|---|
| *B60K 11/08* | (2006.01) |
| *F21S 41/125* | (2018.01) |
| *F21S 41/14* | (2018.01) |
| *F21S 41/141* | (2018.01) |
| *F21S 41/36* | (2018.01) |
| *F21S 41/37* | (2018.01) |
| *F21S 41/39* | (2018.01) |
| *F21S 41/675* | (2018.01) |

(52) U.S. Cl.
CPC .......... *B60K 11/085* (2013.01); *F21S 41/141* (2018.01); *F21S 41/37* (2018.01); *F21S 41/39* (2018.01); *F21S 41/675* (2018.01); *F21S 41/125* (2018.01); *F21S 41/18* (2018.01); *F21S 41/36* (2018.01)

(58) Field of Classification Search
CPC .......... F21S 41/125; F21S 41/36; F21S 41/18; F21S 41/39; F21S 41/141; F21S 41/37; F21S 41/675; B60K 11/085
See application file for complete search history.

(56) References Cited

U.S. PATENT DOCUMENTS

| | | |
|---|---|---|
| 10,071,625 B1 | 9/2018 | Stoddard et al. |
| 10,730,384 B1 | 8/2020 | Klop |
| 11,760,258 B1 | 9/2023 | Lerner |
| 2011/0005851 A1* | 1/2011 | Doroghazi .......... B60R 13/0838 29/897.15 |
| 2013/0068403 A1 | 3/2013 | Fenchak et al. |
| 2014/0090610 A1 | 4/2014 | Higuchi et al. |
| 2014/0273807 A1 | 9/2014 | Frayer, III |

(Continued)

FOREIGN PATENT DOCUMENTS

| | | |
|---|---|---|
| CN | 117068038 A | 11/2023 |
| DE | 202017102639 U1 | 5/2017 |
| DE | 102016203964 A1 | 9/2017 |

(Continued)

OTHER PUBLICATIONS

Innovation Q+ NPL Search (Year: 2024).*

*Primary Examiner* — Anabel Ton
(74) *Attorney, Agent, or Firm* — Vichit Chea; Carlson, Gaskey & Olds, P.C.

(57) ABSTRACT

A vehicle flow control system includes an active grille shutter assembly of a vehicle. The active grille shutter assembly has shutters and a lighting assembly configured to emit light that passes between the shutters. A vehicle lighting method includes emitting light from a lighting assembly through a plurality of shutters of an active grille shutter assembly.

18 Claims, 4 Drawing Sheets

(56) References Cited

U.S. PATENT DOCUMENTS

2024/0208398 A1\* 6/2024 Raghavan ............ B60Q 1/2661

FOREIGN PATENT DOCUMENTS

| DE | 102020209963 | A1 | \* | 8/2021 | ........... B60K 11/085 |
|----|--------------|----|---|--------|----------------------|
| DE | 102020121803 | A1 |   | 2/2022 |                      |
| FR | 3123831      | A1 |   | 12/2022|                      |
| FR | 3144082      | A1 | \* | 6/2024 |                      |

\* cited by examiner

VEHICLE FLOW CONTROL SYSTEM WITH LIGHTING ASSEMBLY

TECHNICAL FIELD

This disclosure relates generally to emitting light through an active grille shutter assembly.

BACKGROUND

Vehicle flow control system can incorporate active grille shutter assemblies having shutters that are actuated to control flow to various areas of a vehicle, such as radiators, condensers, and other systems. The shutters can be opened when flow to a particular area is needed. The shutters can be closed to reduce drag.

SUMMARY

In some aspects, the techniques described herein relate to a vehicle flow control system, including: an active grille shutter assembly of a vehicle, the active grille shutter assembly having a plurality of shutters; and a lighting assembly configured to emit light that passes between the plurality of shutters.

In some aspects, the techniques described herein relate to a vehicle flow control system, wherein the lighting assembly is disposed aft of the active grille shutter assembly.

In some aspects, the techniques described herein relate to a vehicle flow control system, wherein the lighting assembly is disposed horizontally between the plurality of shutters and a component of the vehicle.

In some aspects, the techniques described herein relate to a vehicle flow control system, wherein the component is a radiator of the vehicle.

In some aspects, the techniques described herein relate to a vehicle flow control system, wherein the lighting assembly is disposed vertically above the plurality of shutters.

In some aspects, the techniques described herein relate to a vehicle flow control system, wherein the plurality of shutters are configured to pivot about respective vertically extending axes.

In some aspects, the techniques described herein relate to a vehicle flow control system, wherein the active grille shutter assembly is a first active grill shutter assembly on a passenger side of a frunk, and further including a second active grille shutter assembly on a driver side of the frunk.

In some aspects, the techniques described herein relate to a vehicle flow control system, wherein the plurality of shutters each include a reflective optics region that reflects light.

In some aspects, the techniques described herein relate to a vehicle flow control system, wherein the optics are molded.

In some aspects, the techniques described herein relate to a vehicle flow control system, wherein the optics are on a backside of the plurality of shutters.

In some aspects, the techniques described herein relate to a vehicle flow control system, wherein the plurality of shutters includes a rylene dye.

In some aspects, the techniques described herein relate to a vehicle flow control system, wherein the lighting assembly is a light bar.

In some aspects, the techniques described herein relate to a vehicle flow control system, wherein the lighting assembly includes a plurality of light emitting diodes.

In some aspects, the techniques described herein relate to a vehicle lighting method, including: emitting light from a lighting assembly through a plurality of shutters of an active grille shutter assembly.

In some aspects, the techniques described herein relate to a vehicle lighting method, further including rotating the plurality of shutters to change an amount of light passing through the plurality of shutters.

In some aspects, the techniques described herein relate to a vehicle lighting method, further including changing a color of light emitted through the plurality of shutters based on a charging status of a vehicle.

In some aspects, the techniques described herein relate to a vehicle lighting method, further including reflecting at least some of the light off of optics of the plurality of shutters.

In some aspects, the techniques described herein relate to a vehicle lighting method, further including changing an intensity of the light to change an amount of light passing through the plurality of shutters.

In some aspects, the techniques described herein relate to a vehicle lighting method, wherein the lighting assembly is aft of the active grille shutter assembly.

In some aspects, the techniques described herein relate to a vehicle lighting method, wherein the active grille shutter assembly is a first active grille shutter assembly on a passenger side of a frunk, and further including a second active grille shutter assembly on a driver side of the frunk.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

Figure 1:
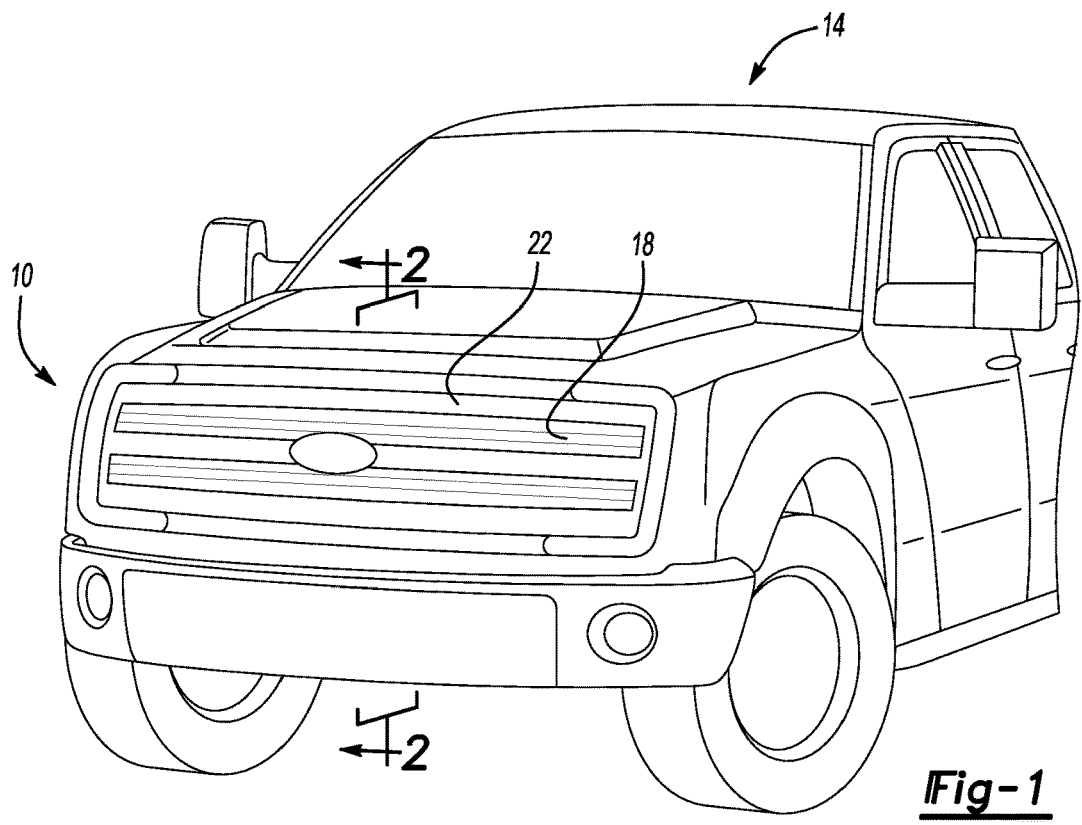
FIG. 1 illustrates a perspective view of a vehicle having a flow control system according to an exemplary aspect of the present disclosure.
Figure 2:
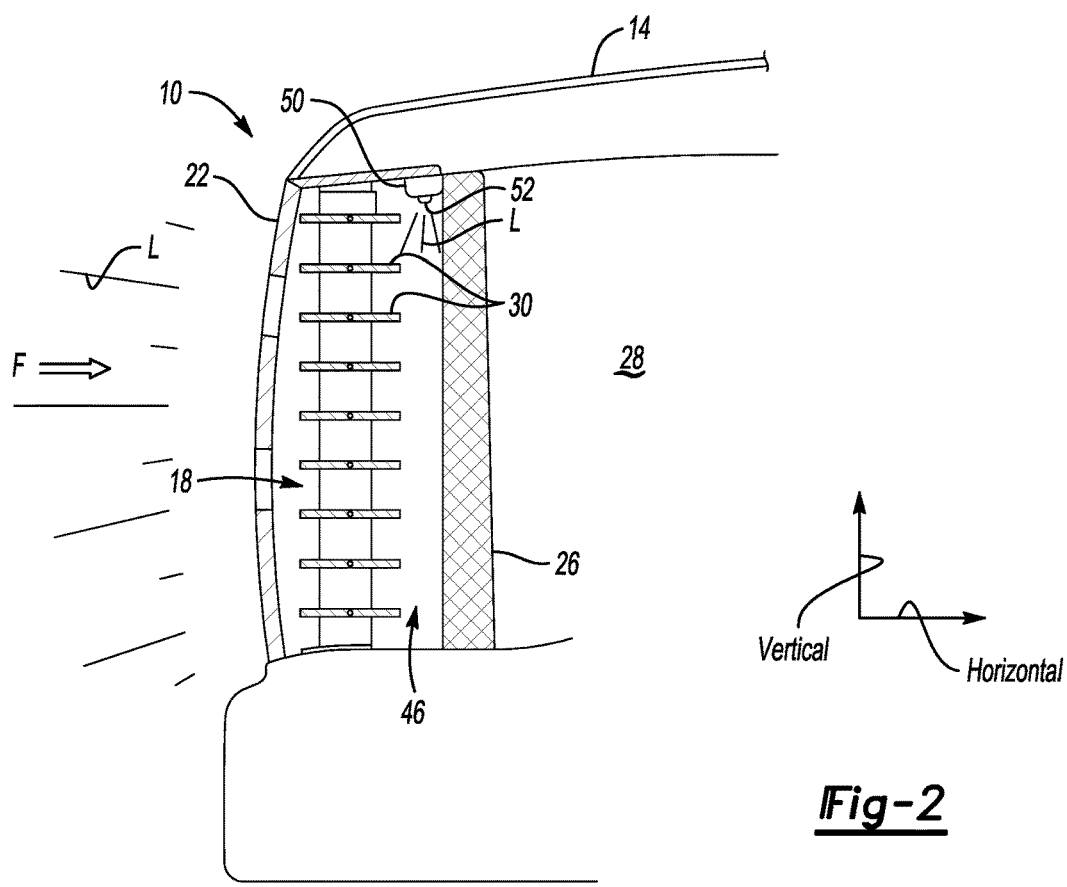
FIG. 2 illustrates a section view taken at line 2-2 in FIG. 2.
Figure 3:
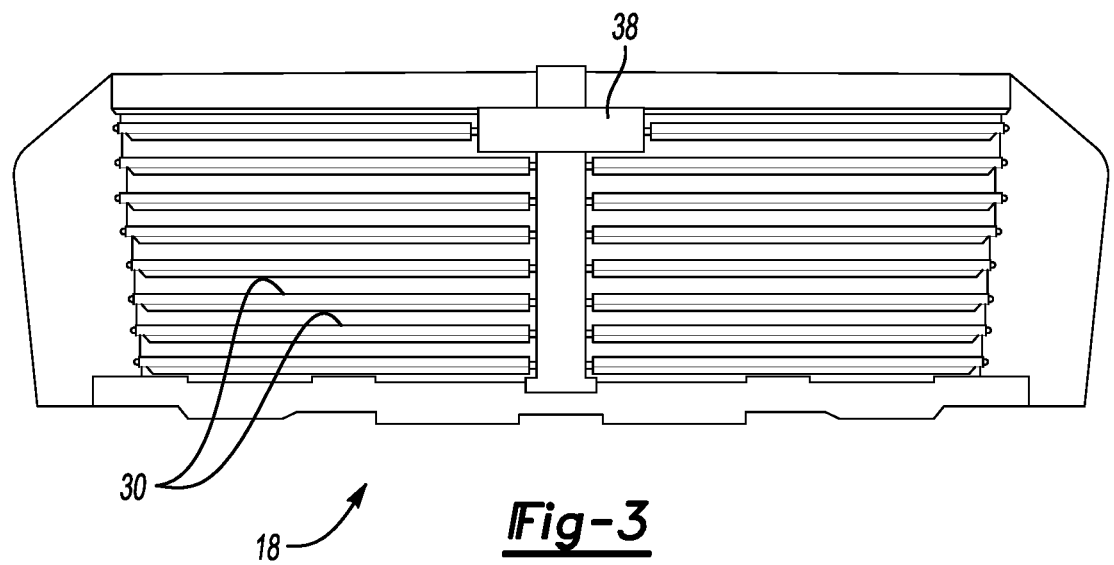
FIG. 3 illustrates a front view of an active grille shutter assembly from the system of FIG. 1.
Figure 4:
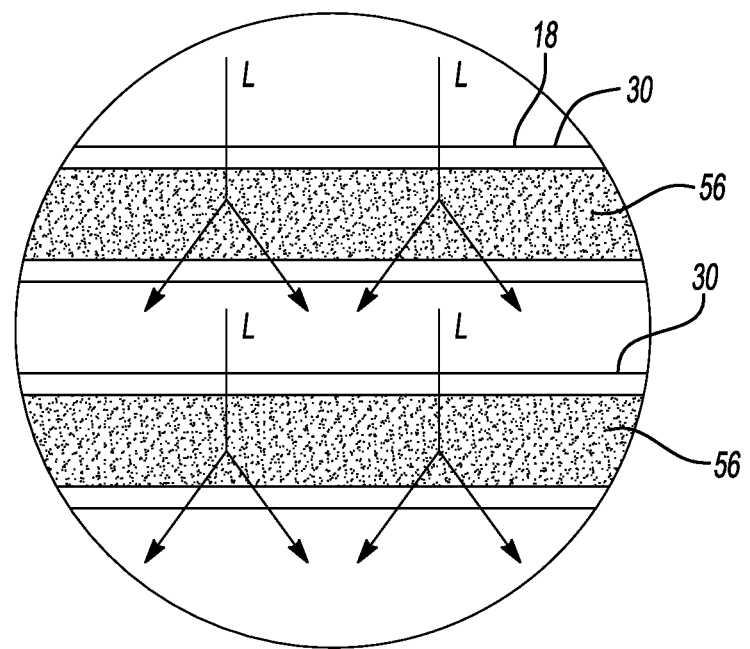
FIG. 4 illustrates a close up of Area 4 in FIG. 3.
Figure 5:
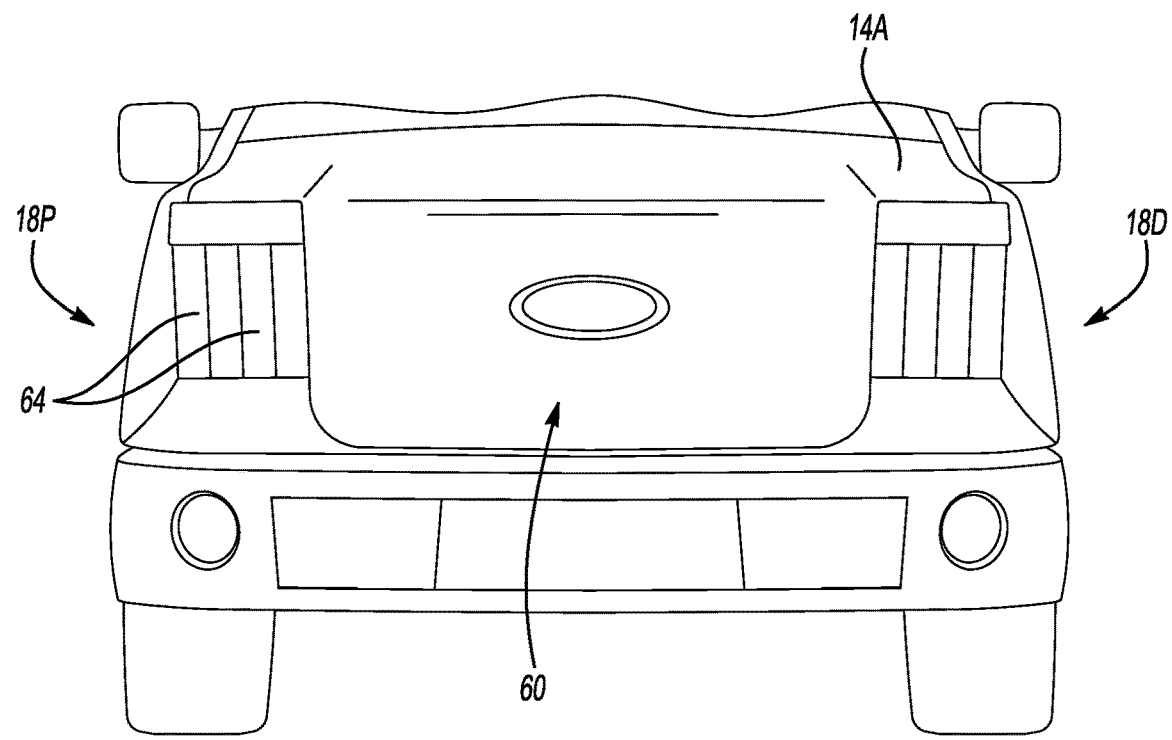
FIG. 5 illustrates a front view of a vehicle having an active grill shutter system according to another exemplary aspect of the present disclosure.

An active grille shutter assembly of a vehicle flow control system can include shutters that can be moved between positions that permit more flow through the active grille shutter assembly and positions that permit less flow through active grille shutter assembly. Exemplary embodiments of this disclosure emit light that passes though the shutters of the active grill system.

Referring to FIGS. 1-4, in an exemplary embodiment, a front 10 of a vehicle 14 includes a flow control system having an active grille shutter assembly 18 disposed between a decorative grille 22 and a radiator 26. The active grille shutter assembly 18 is utilized to control movement of a flow F of air from outside the vehicle 14 to the radiator 26 and then to the engine compartment 28.

Although disclosed in connection with the vehicle 14 and the radiator 26, the active grille shutter assembly 18 could be utilized to control flow through an opening in another area of the vehicle 14, such as an opening to a passenger cabin of the vehicle 14, and to another component of the vehicle 14.

The active grille shutter assembly 18, in this exemplary non-limiting embodiment, includes a plurality of shutters 30 that are each pivotably secured within a grille housing 34. The active grille shutter assembly 18 further includes an actuator assembly 38 that is used to move the shutters 30. The shutters 30 each pivot about a respective horizontally extending axis in this example. In another example, the shutters 30 could each pivot about a vertically extending axis.

The shutters 30 can, for example, be pivoted to a position that permits more flow to the radiator 26 when cooling the radiator 26 is desired. The shutters 30 can be pivoted to a position that permits less flow to provide when cooling the radiator 26 is no longer desired. The position that permits less flow can enhance aerodynamics.

With reference to an orientation of the vehicle 14, the active grille shutter assembly 18 is in front of the radiator 26. The shutters 30 are spaced a distance from the radiator 26 establishing an open area 46 between the shutters 30 and the radiator 26.

A lighting assembly 50 can be activated to selectively emit light L into the open area 46. At least some of the light L passes from the open area 46 and is emitted through the shutters 30. An observer viewing the front 10 of the vehicle 14 can see the light L emitted through the shutters 30. The emitted light L can appear as a plurality of strips of light. A width of the strips of light can be changed by pivoting the shutters 30. Moving the shutters 30 to positions that permit more flow increases a width of the strips of light. Moving the shutters 30 to positions that permit less flow decreases a width of the strips of light. Changing a width of the strips of light can provide a desired visual appearance.

In this example, the lighting assembly 50 is disposed aft the active grille shutter assembly 18 and is horizontally between the shutters 30 and the radiator 26. The lighting assembly 50 is vertically above the shutters 30 and emits light downward into the open area 46. Horizontal and vertical are, for purposes of this disclosure, with reference to ground and a general orientation of the vehicle 14 during operation.

The lighting assembly 50 is a light bar having a plurality of light emitting diodes 52. The lighting assembly 50 can selectively emit light in a plurality of different colors. The color of the emitted light can be changed to provide a desired visual appearance. During assembly, the lighting assembly 50 can be installed In this example, the shutters 30 each includes a reflective optics region 56. As the light L passes between the shutters 30, at least some of the light L is reflected off of the reflective optics regions 56. Reflecting at least some of the light L can facilitate providing a desired visual appearance. The reflective optics regions 56 can be molded into the shutters 30. The reflective optics regions 56 can be on a backside of the shutters 30—a side facing the radiator 26 and the engine compartment 28. The reflective optics regions 56 could instead be provided by a reflective paint or a reflective tape.

In some examples, the shutters 30 can include a rylene dye or long persistent phosphor that can, to provide a desired visual appearance, continue emit light after the lighting assembly 50 is deactivated.

With reference now to FIGS. 5-8, in another exemplary embodiment, the vehicle 14A is an electrified vehicle having a frunk 60. The vehicle includes a first active grille shutter assembly 18P on a passenger side of the frunk 60, and a second active grille shutter assembly 18D on a driver side of the frunk 60.

The first and second active grille shutter assemblies 18P, 18D each include shutters 64 that rotate about respective vertically extending axes. The shutters 64 of the active grille shutter assembly 18P are rotated to control flow to a component 66, which can be a radiator on the passenger side of the vehicle 14A. Like the shutters 30 of the embodiment of FIGS. 1-4, the shutters 64 can include optics that reflect light and can instead, or additionally comprise a rylene dye.

A lighting assembly 68 can be associated with the first active grille shutter assembly 18P. Another lighting assembly can be associated with the second active grille assembly. Activating the lighting assembly 68 emits light that can pass between the shutters 64 of the first active grille shutter assembly 18P.

Figure 6:
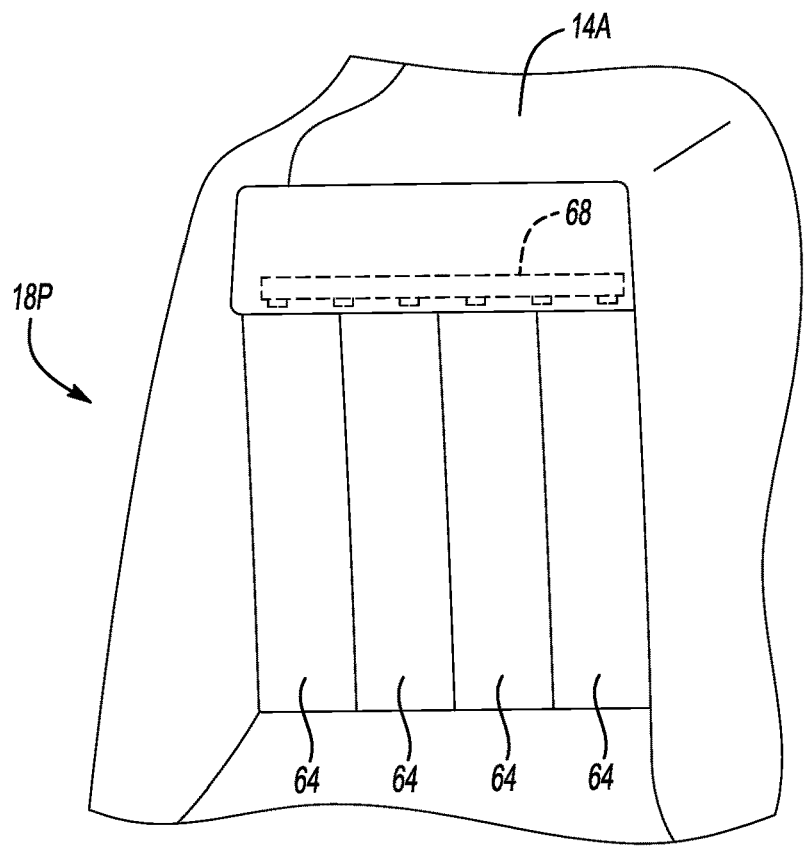
FIG. 6 illustrates a close up view of an active grille shutter assembly from the system of FIG. 5 when shutters of the assembly are in a flow restricting position.
Figure 7:
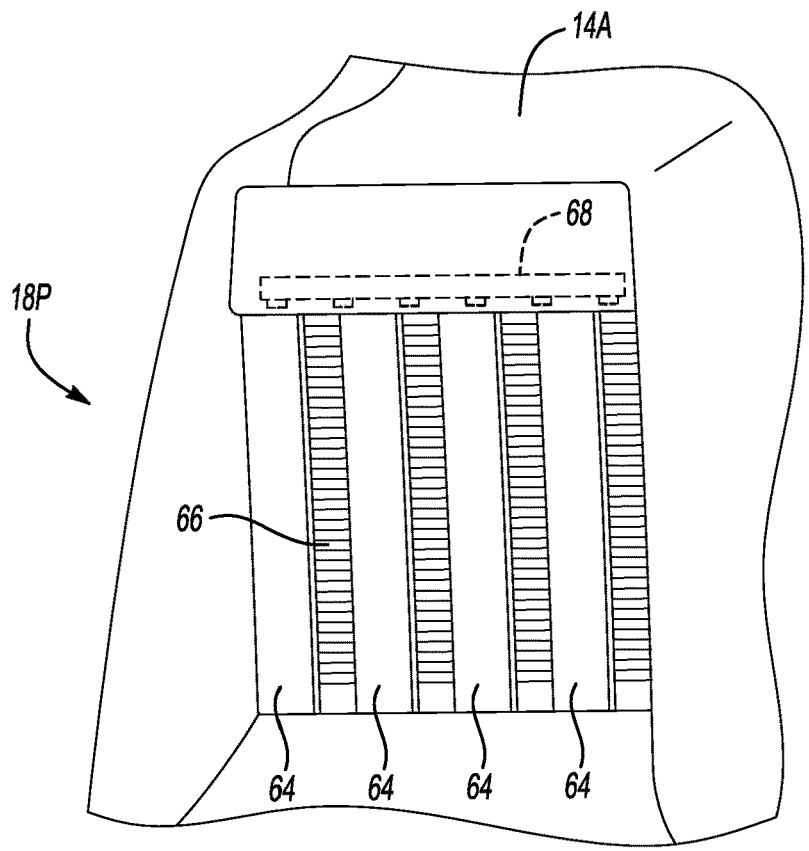
FIG. 7 illustrates a close up view of an active grille shutter assembly from the system of FIG. 5 when shutters of the assembly are in a position that permits more flow than the position of FIG. 6.
Figure 8:
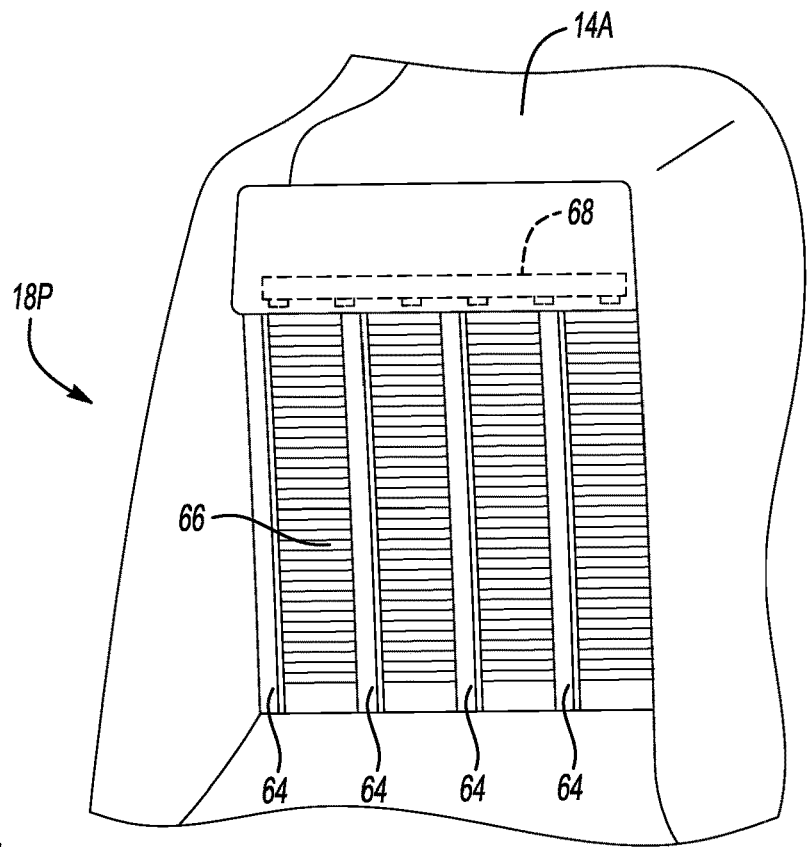
FIG. 8 illustrates a close up view of an active grille shutter assembly from the system of FIG. 5 when shutters of the assembly are in a position that permits more flow than the position of FIG. 7.

When the shutters 64 are in a flow restricting position shown in FIG. 6, little to no light passes between the shutters 64. Rotating the shutters 64 to the position of FIG. 7 increase an area between the shutters 64 and permits more light to pass between the shutters 64. Rotating the shutters 64 further to the position of FIG. 8 increases the area between the shutters 64 and permits even more light to pass between the shutters 64. Rotating the shutters 64 thus changes an amount of light passing through the shutters 64 as well as the flow of air.

In an example, the color of the light emitted between the shutters 64 can be varied based on a charging status of the vehicle 14A. If, for example, the vehicle 14A is being charged at a charging station, the light emitted between the shutters 64 can be red when the state of charge is low. As the charging continues and the state of charge increases, the color of the light emitted between the shutters 64 can be changed from yellow and then to green. The green color can indicate that the vehicle 14A has reached a desired state of charge. An observer viewing the vehicle 14A can understand a charging status of the vehicle 14A by viewing the color of the light emitted between the shutters 64.

In some examples, an intensity of the light emitted between the shutters 64 can also be varied based on, for example, a charging status of the vehicle 14A. In a specific example, the intensity increases as the vehicle 14A charges and moves closer to a desired state of charge.

Other potential modes of operation can include activating the lighting assembly 68 in response to another vehicle moving within a certain range of the vehicle 14A. The light from the lighting assembly 68 can provide notification to the vehicle moving closer to the vehicle 14A.

The shutters 64 could, in some examples, rotating to emit more light and then rapidly close to provide a "winking" type appearance. This could be in response to a recognized vehicle moving closer to the vehicle 14A.

The rotation of the shutters 64 to change how much light is emitted between the shutters 64, the intensity of the light emitted between the shutters 64, the color of the light emitted between the shutters 64, or some combination of these, can be based on the how close the vehicle 10 is to another vehicle. If the other vehicle is approaching the vehicle 10, the light can, for example, change from green to orange to red based on how close the other vehicle is to the vehicle 10. If the other vehicle is approaching the vehicle 10 more quickly than desired, the lights can increase in intensity to increase visibility of the vehicle 10.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A vehicle flow control system, comprising:
   an active grille shutter assembly of a vehicle, the active grille shutter assembly having a plurality of shutters; and
   a lighting assembly configured to emit light that passes between the plurality of shutters, wherein the lighting assembly is disposed horizontally between the plurality of shutters and a component of the vehicle.

2. The vehicle flow control system of claim 1, wherein the lighting assembly is disposed aft of the active grille shutter assembly.

3. The vehicle flow control system of claim 1, wherein the component is a radiator of the vehicle.

4. The vehicle flow control system of claim 1, wherein the lighting assembly is disposed vertically above the plurality of shutters.

5. The vehicle flow control system of claim 1, wherein the plurality of shutters are configured to pivot about respective vertically extending axes.

6. The vehicle flow control system of claim 1, wherein the active grille shutter assembly is a first active grill shutter assembly on a passenger side of a frunk, and further comprising a second active grille shutter assembly on a driver side of the frunk.

7. A vehicle flow control system, comprising:
   an active grille shutter assembly of a vehicle, the active grille shutter assembly having a plurality of shutters; and
   a lighting assembly configured to emit light that passes between the plurality of shutters, wherein the plurality of shutters each comprise a reflective optics region that reflects light.

8. The vehicle flow control system of claim 7, wherein the optics are molded.

9. The vehicle flow control system of claim 7, wherein the optics are on a backside of the plurality of shutters.

10. The vehicle flow control system of claim 1, wherein the plurality of shutters comprises a rylene dye.

11. The vehicle flow control system of claim 1, wherein the lighting assembly is a light bar.

12. The vehicle flow control system of claim 1, wherein the lighting assembly includes a plurality of light emitting diodes.

13. A vehicle lighting method, comprising:
    emitting light from a lighting assembly through a plurality of shutters of an active grille shutter assembly; and
    rotating the plurality of shutters to change an amount of light passing through the plurality of shutters.

14. The vehicle lighting method of claim 13, further comprising changing a color of light emitted through the plurality of shutters based on a charging status of a vehicle.

15. The vehicle lighting method of claim 13, further comprising reflecting at least some of the light off of optics of the plurality of shutters.

16. The vehicle lighting method of claim 13, further comprising changing an intensity of the light to change an amount of light passing through the plurality of shutters.

17. The vehicle lighting method of claim 13, wherein the lighting assembly is aft of the active grille shutter assembly.

18. The vehicle lighting method of claim 13, wherein the active grille shutter assembly is a first active grille shutter assembly on a passenger side of a frunk, and further comprising a second active grille shutter assembly on a driver side of the frunk.

* * * * *